United States Patent [19]

Weidel

[11] Patent Number: 4,867,520
[45] Date of Patent: Sep. 19, 1989

[54] OPTICAL FIBER MULTIPLEXER

[75] Inventor: Edgar Weidel, Senden, Fed. Rep. of Germany

[73] Assignee: Licentia Patent Verwaltungs GmbH, Fed. Rep. of Germany

[21] Appl. No.: 644,980

[22] Filed: Aug. 28, 1984

Related U.S. Application Data

[63] Continuation of Ser. No. 324,086, Nov. 23, 1981.

[30] Foreign Application Priority Data

Nov. 27, 1980 [DE] Fed. Rep. of Germany ....... 3044667
Sep. 5, 1981 [DE] Fed. Rep. of Germany ....... 3135312

[51] Int. Cl.$^4$ .......................... G02B 6/28; H04B 9/00
[52] U.S. Cl. ........................ 350/96.16; 350/96.15; 350/96.10; 350/96.18; 370/3
[58] Field of Search ............... 350/96.10, 96.15, 96.16, 350/96.18, 96.20, 96.21, 96.22; 250/227; 370/1, 2, 3, 4

[56] References Cited

U.S. PATENT DOCUMENTS

| 4,165,496 | 8/1979 | Di Domenico, Jr. et al. ... 350/96.15 |
| 4,193,663 | 3/1980 | Timmermann ................... 350/96.18 |
| 4,243,297 | 1/1981 | Elion ................................. 350/96.15 |
| 4,726,012 | 2/1988 | Amadieu et al. ........................ 370/3 |
| 4,770,485 | 9/1988 | Buckley et al. .................. 350/96.18 |
| 4,790,615 | 12/1988 | Seki et al. ..................... 350/96.15 X |
| 4,790,616 | 12/1988 | Frenkel et al. .................... 350/96.15 |
| 4,813,756 | 3/1989 | Frenkel et al. .................... 350/96.18 |

FOREIGN PATENT DOCUMENTS

| 2625097 | 12/1977 | Fed. Rep. of Germany ... 350/96.18 X |
| 2851625 | 6/1980 | Fed. Rep. of Germany ... 350/96.15 X |
| 2851654 | 6/1980 | Fed. Rep. of Germany ... 350/96.15 X |
| 55-2280 | 1/1980 | Japan ................................ 350/96.15 |

OTHER PUBLICATIONS

Miyauchi et al., "Compact Wavelength . . . Pieces", Optics Lett., 7/80, vol. 5, No. 7, pp. 321–322.

Primary Examiner—William L. Sikes
Assistant Examiner—Brian M. Healy
Attorney, Agent, or Firm—McGlew & Tuttle

[57] ABSTRACT

An optical multiplexer is disclosed which comprises three waveguides, one for admitting or emitting light and two for receiving light. Each waveguide has an end face. One of the receiving waveguides has an optical layer on its end face which is disposed at an angle to the optical axis of that waveguide. The waveguides are juxtaposed so that their optical axes intersect substantially at the end face of the one receiving waveguide. The optical layer transmits part of the light into the one receiving waveguide. The remainder of the light is reflected into the other receiving waveguide. The intervening space at least partly bounded by the end faces of the waveguides have an index of refraction different from the waveguides themselves.

15 Claims, 2 Drawing Sheets

OPTICAL FIBER MULTIPLEXER

This is a continuation of application Ser. No. 324,086, filed Nov. 23, 1981.

FIELD AND BACKGROUND OF THE INVENTION

The present invention relates in general to optical equipment and, in particular, to a new and useful optical multiplexer, of splitting the light beam conducted in one light waveguide into at least two further light waveguides.

Multiplexers of this kind are known for example, from the articles: "Interference Filter All-Fibre Directional Coupler for W.D.M.", by H. F. Mahlein et al., *Electronic Letters* 16, 1980, pages 584 to 585, and "Compact Wavelength Multiplexer Using Optical-Fiber Pieces", by E. Miyanchi et al., *Optics Letter* 5, 1980 pages 321–322.

In such arrangements, the end faces of optical fiber pieces are disposed as close to each other as possible, in such a way as to permit a distribution of the light beam from one fiber to a plurality of fibers through partly transmitting or wavelength-dependent reflecting layers which are applied to polished oblique end faces of the fibers. In any of these prior art arrangements, a material is provided between the fiber ends, intended to match the indices of refraction of the fibers. Since all the mentioned arrangements employ dielectric reflecting layers, it is difficult or even impossible to heat-seal the fiber ends and further optical component parts to each other. A simple, conventional method of matching the indices is to fill the space between the fiber ends with a transparent plastic, for example, epoxy resin.

This is decidely a solution for experimental purposes; however, it is questionable whether such an arrangement has a satisfactory long-term stability required for industrial application. That is, the light intensities usually ocurring in fiber-optical systems are very high. for a gradient fiber having a core diameter of 50 microns and a luminous flux of 2 mW which is conducted in the fiber core, an intensity of 100 W per cm² may be computed. This is a very high value. Therefore, the question arises whether, under a constant irradiance with a light of such intensity, an organic cement (such as epoxy resin) does not succumb to aging, which process may lead, for example, to a clouding of, or absorption in, the initially transparent cement.

SUMMARY OF THE INVENTION

The invention is directed to an improvement in optical multiplexers which makes it unnecessary to match the indices of refraction and which insures a long-term stability of the system.

Accordingly, an object of the present invention is to provide an optical multiplexer which comprises at least two light waveguides each having an index of refraction, an end face and an optical axis, with the optical axes of the waveguides approximately intersecting each other at at least one point on an end face of one of said light waveguides; an optical layer disposed on the end face of said one light waveguide for partly reflecting and partly transmitting light coming into the one waveguide; the one end face forming an angle $\gamma$ with the optical axis of said one waveguide so that a light beam coming from outside said one waveguide and incident on the end face of said one waveguide is coupled to the one light waveguide; and the end faces at least partly bounding a space which has an optical index of refraction different from that of the one waveguide.

One of the principal advantages of the invention is that the optical multiplexer can be manufactured as a constructional part requiring no maintenance.

Another object of the invention is thus to provide an optical multiplexer which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, some embodiments of the invention are explained in more detail with reference to the accompanying drawings in which.

DESCRIPTION OF THE PREFERRED EMBODIMENTS

Figure 1:
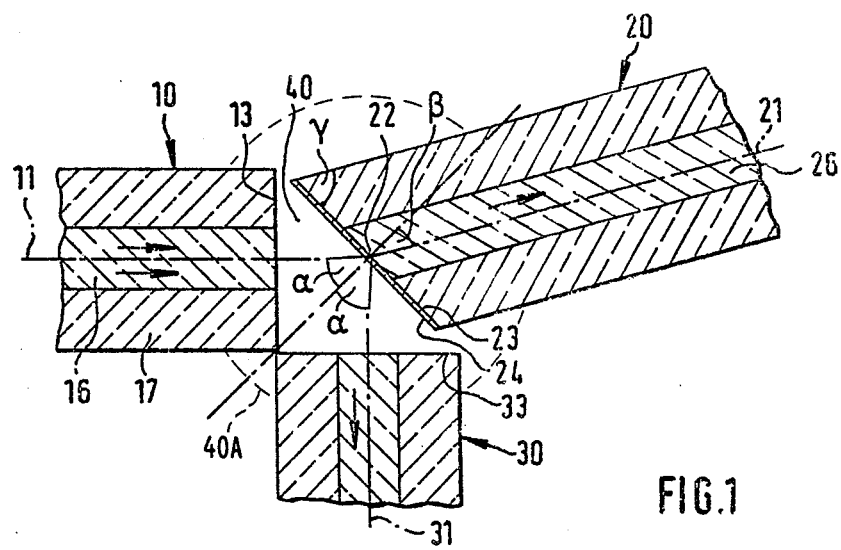
FIGS. 1 to 4 are sectional views which illustrate different embodiments.

Referring to the drawings in particular, the invention embodied therein, in FIG. 1, comprises a plurality of light waveguides 10, 20 and 30 which each have an optical axis 11, 21 and 31 respectively. Each of the waveguides include an end face 13, 23 and 33 respectively. An optical layer 24 is defined on one of the waveguides 20 and positioned at an angle $\gamma$ to its axis 21 so that light striking the layer 24 from one of the waveguides 10 will be partly reflected into waveguide 30 and partly transmitted into waveguide 20. The index of refraction of the space 40 at least partly bounded by the waveguide end faces has an index of refraction different from that of the waveguides, in particular waveguide 20, so that the light is properly refracted or coupled into waveguide 20 in a manner which is parallel to its major axis 21. The waveguides may be optical fibers.

The light beam (arrows) oncoming through the waveguide or optical fiber 10 having a core 16 and a shell 17, is to be branched into optical fibers 20 and 30. The end face 13 of fiber 10 is at an angle of 90° to its optical axis 11, and the light emerging from fiber 10 into space 40 is not refracted but continues to travel in the direction of the optical axis 11 to fall upon the optical layer 24, which is, for example, a dielectric, semitransparent mirror. One fraction of the light beam is reflected at the angle of refraction and coupled to fiber 30. In the shown embodiment, three fiber waveguides 10, 20, 30 are so arranged that their optical axes 11, 21, 31 intersect at a single point 22 on layer 24. The other fraction of the light beam is refracted by layer 24 to fiber waveguide 20, at an angle $\beta$, where:

$$\beta = \sin^{-1}\left(\frac{1}{n_K}\sin\alpha\right);$$

wherein $n_K$ is the effective index of refraction of fiber core 26, of fiber 20 and $\alpha$ is the angle of incidence and reflection of the light.

Then, for any $\gamma$; $\gamma = 90° - \beta$.

The respective values for the shown example are: $\alpha = 45°$; $n_K = 1.46$;

$$\beta = \sin^{-1}\left(\frac{1}{1.46} \sin 45°\right) = 29°;$$

$\gamma = 90° - \beta = 61°$.

The provided angle of incidence may be different, preferably within the range of 20° to 45°. Angles $\gamma$ and $\beta$ will then change accordingly.

The nature of dielectric layer 24 is determining for the desired distribution of the light between fiber 20 and fiber 30. Depending on the requirements of the system, the provided ratio of distribution may be 1 to 1, or another proportion. It is further possible to choose a distribution independent of the involved wavelengths, or one which is dependent thereon. In the latter case, a layer 24 of such nature is provided, for example, that of the light oncoming through fiber 10 and comprising wavelengths $\lambda_1$ and $\lambda_2$, the wavelength $\lambda_1$ is directed with a great coupling efficiency to fiber 20, while the wavelength $\lambda_2$ is directed with a great coupling efficiency to fiber 30. Such an arrangement utilizes the dichroizm of layer 24 and may be employed in an optical demultiplexer, for example.

The direction of the luminous flux is reversible, at least partly. For example, a constructional part for the so-called duplex operation is useful (utilizing a line in both directions), in which the light of a wavelength $\lambda_1$ oncoming through fiber 10 is completely directed to fiber 30, while the light of a wavelength $\lambda_2$ oncoming through fiber 20 (against the direction of the arrow) is directed, as far as possible completely, to fiber 10 (against the direction of the arrows). Such a constructional part makes two-way communication between two users possible.

Aside from the elimination of cementing material, another considerable advantage of the inventive design over the prior art is that layers 24 which have more suitable properties may be employed. In the prior art, if an angle is provided between the normal to layer 24 and the axis 11 of the fiber conducting the oncoming light, the angle formed at the glass side is $\alpha$ (refractive index approximately 1.5). In the inventive multiplexer, however, an angle $\beta$ is formed at the glass side. It is known from thin film optics that the edge steepness (optical filter action) of a dielectric beam-splitting layer can be increased within the wavelength region the less the angle of incidence of the light on the layer deviates from the normal. With a deviation from the normal incidence, the various directions of polarization of the light are reflected or transmitted with unequal reflectances and unequal dependencies on the wavelength. Also, with a divergent light beam, the edge steepness is more unfavorably affected, the more the angle of incidence deviates from the perpendicular. With the omission of an optical cement layer, angle $\beta$ becomes important for an optical filtering action, with the same angle $\alpha$ as in a prior art cemented arrangement, while in these prior art cemented arrangements, the angle $\alpha$ is the determining factor. If, for example, angle $\alpha$ is reduced to 20°, angle $\beta$ is 13.5°. In such an arrangement, beam-splitting layers with an outstanding edge steepness are usable, so that in a wavelength multiplex operation, the inventive solution makes it possible to separate closely adjacent wavelengths from each other.

Any kind of optical fibers can be employed as light guiding fibers, for example, fibers for monochromatic light, or multimode fibers with a stepped or graded index profile.

The inventive multiplexer is affected with losses, since the light must travel in space 40 through a medium without wave guidance, such as air. In this zone without guidance, the light beam enlarges by diffraction and beam divergence (multimode fiber), and a fraction of the light fails to become coupled to the cores of the fibers. To reduce these losses, the shells of the fibers, preferably of fibers 10 and 30, may partly be removed, by etching, for example. The path of the light in the medium without guidance is thereby shortened and the losses are reduced.

To protect the surfaces from damages or moisture deposits, an airtight encapsulation of the fiber ends may be provided, e.g. per end enclosing space or chamber structure 40A, as shown schematically in phantom in FIG. 1, and which may contain a vacuum or be filled with a gas.

Figure 3:
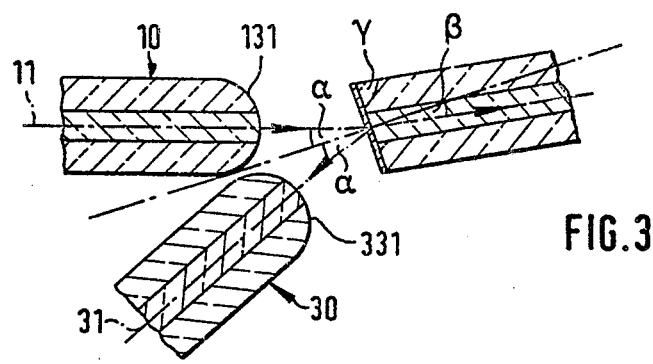
Figure 4:
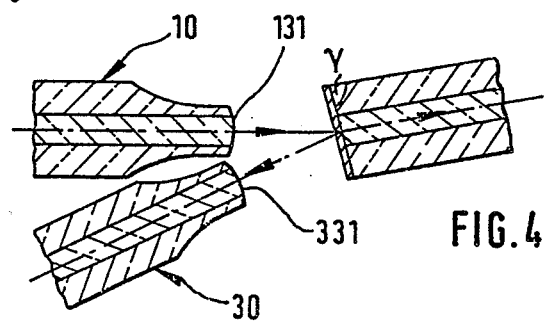
Figure 5:
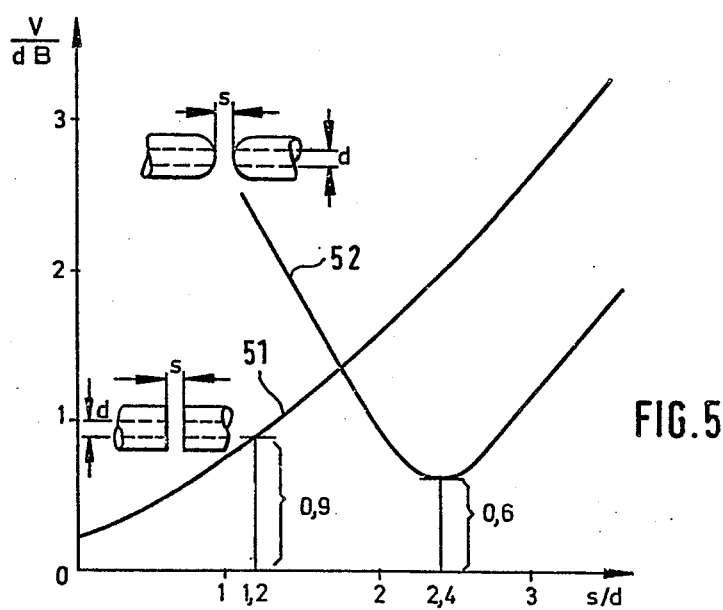
FIG. 5 is a schematic diagram in explanation of the embodiments of FIGS. 3 and 4.

FIGS. 3 and 4 show further embodiments of the invention. First, their operation is explained with reference to the diagram of FIG. 5 in which, by way of example, the optical coupling losses V, in dB, are plotted against the standard distance ratio s/d (face distance/filler core diameter). In the graph, s indicates the distance (optical path) between one end faces of coaxial light waveguides having a core and a shell. The shown curves 51 and 52 relate to glass fiber waveguides taken as example and each having a shell with an outer diameter of about 130 microns and a core d with a diameter of about 50 microns. Curve 51 shows the coupling losses as a function of distance s for planar end faces between which, air forms the coupling medium. According to curve 51, the coupling losses V rise with the increase of distance s optical path). In the arrangement that curve 52 is based upon, the end faces of the light waveguide are fused to spherical lenses which have a radius of curvature approximately equal to half the outer diameter of the shell. Curve 52 shows a distinct minimum of coupling losses V, which approxmately corresponds to a standard distance ratio s/d of 2.4.

In an optical multiplexer according to FIG. 1, it is not possible, for constructional reasons, to reduce the optical path between planer end faces 13 and 33 below a standard distance ratio s/d of 1.2. According to FIG. 5 at curve 51, this corresponds to a coupling loss V of about 0.9 dB. However, if the end faces are fused to spherical lenses, it is advisable, as follows from curve 52, to provide a standard distance ratio s/d of 2.4 at which the coupling losses are reduced to only 0.6 dB. This results in a double optical path, substantially simplifying the mechanical construction as well as the optical adjustment of a multiplexer designed in accordance with FIG. 3. Moreover, an angle $2\alpha$ less than 90° between axes 11 and 31 may then be provided. Such an arrangement results in the further advantage that the employed interference filters act more selectively, since in interference filters, it is advantageous to minimize the angle of incidence of the light.

According to FIG. 4, it is possible to further reduce the angle $2\alpha$ if the outer diameter of the shell of the light waveguides in the zone of lenses 131,331 is reduced, for example, by etching.

Figure 2:
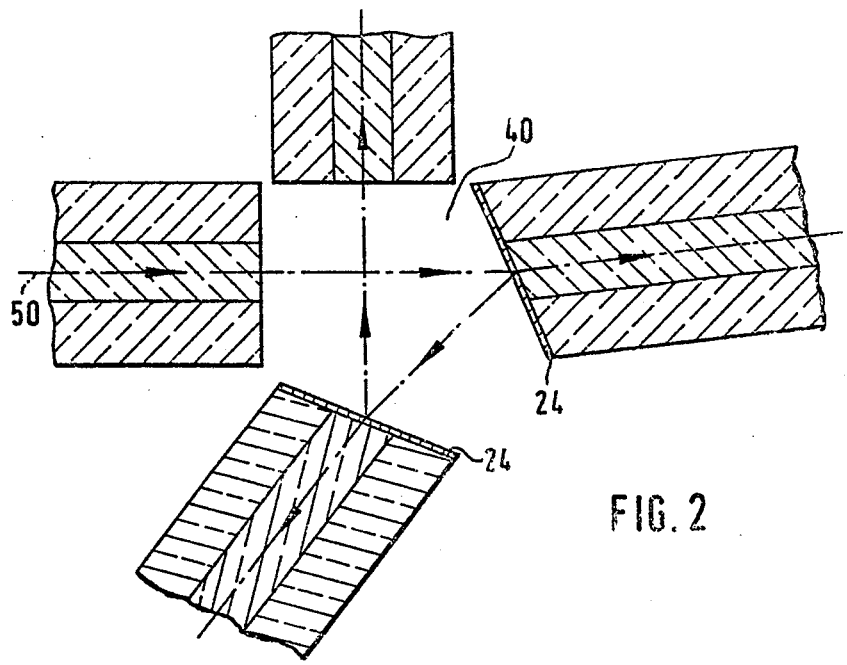

Light waveguides with endwise fused lenses may also be suitable for a multiplexer according to FIG. 2.

To further reduce the coupling losses, it is advisable to deposit on the end faces and/or the lenses bounding space 40, a so called antireflex coating, for the light used.

In a further embodiment, at least one of the optical fibers is replaced by at least one photodetector, such as a photodiode. This makes it possible, for example to measure and/or control the intensity of the light coupled to an optical fiber. In FIG. 1, for example, the waveguide 30 is replaced with a detector having a detection surface at the end face 33 location.

While specific embodiments of the invention have been shown and described in detail to illustrate the application of the principles of the invention, it will be understood that the invention may be embodied otherwise without departing from such principles.

What is claimed is:

1. Optical multiplexer comprising:
   at least three light waveguides each having an end face, an index of refraction and an optical axis, with the optical axes of the waveguides approximately intersecting at at least one point on an end face of one of said waveguides;
   an optical layer defined on the end face of said one waveguide for partly reflecting and partly transmitting light coming from the exterior of said one waveguide into said one waveguide;
   the end face of said one waveguide forming an angle $\gamma$ with the optical axis of said one waveguide, so that a light beam coming from outside said one waveguide and incident on its end face is coupled to said one waveguide;
   said end faces of said at least three waveguides being arranged in spaced apart relation and at least partly bounding an interventing space which has an optical index of refraction which is different from that of said one waveguide; and
   two of said waveguides without said optical layer having end faces fused into optical lenses and positioned at an optical distance from each other to minimize coupling losses of light transmitted through said space, at least three waveguides being combined in an integrated optical constructional unit, each said waveguide comprising an optical fiber waveguide having a core of a first diameter for coupling and conducting light extending along the axis thereof and a shell surrounding said core and having a second larger diameter, the diameter of each said optical lens being between that of its said core and its said shell.

2. Multiplexer of claim 1, wherein said second larger diameter of the shell adjacent each optical lens is reduced.

3. Multiplexer of claim 1, wherein each said waveguide comprises a monomode optical fiber waveguide.

4. Multiplexer of claim 1, wherein each said optical lens is substantially spherical.

5. Multiplexer of claim 4, wherein each said optical lens has a radius corresponding substantially to one half the outer diameter of the waveguide carrying said lens.

6. Multiplexer of claim 1, wherein each said optical lens is provided with an anti-reflex coating for the light used in the optical multiplexer.

7. Multiplexer of claim 1, wherein said space contains a vacuum.

8. Multiplexer of claim 1, wherein said space is filled with a gas.

9. Multiplexer of claim 1, including an optical medium in said space.

10. Multiplexer of claim 1, wherein said angle $\gamma$ is chosen so that light coupled into said one waveguide is coupled approximately in a direction of the optical axis of said one waveguide.

11. Multiplexer of claim 1, wherein said angle $\gamma$ is selected so that light coming into said one waveguide becomes polarized.

12. Multiplexer of claim 1, wherein said optical layer is selected so that a proportion of light reflected by the optical layer to light coupled through the optical layer is predetermined.

13. Multiplexer of claim 11, wherein said angle $\gamma$ is selected so that the proportion of light reflected by said optical layer to the amount coupled through the optical layer to the one waveguide is predetermined.

14. Multiplexer of claim 1, wherein said optical layer comprises a dichroic layer.

15. Multiplexer of claim 1, wherein said optical layer is an optical filter layer.

* * * * *